US008605381B2

(12) United States Patent
Mathew et al.

(10) Patent No.: US 8,605,381 B2
(45) Date of Patent: Dec. 10, 2013

(54) SYSTEMS AND METHODS FOR PHASE COMPENSATED HARMONIC SENSING IN FLY HEIGHT CONTROL

(75) Inventors: George Mathew, San Jose, CA (US);
Pradeep Padukone, San Jose, CA (US);
Hongwei Song, Longmont, CO (US);
Suharli Tedja, San Ramon, CA (US)

(73) Assignee: LSI Corporation, San Jose, CA (US)

( * ) Notice: Subject to any disclaimer, the term of this patent is extended or adjusted under 35 U.S.C. 154(b) by 620 days.

(21) Appl. No.: 12/875,734

(22) Filed: Sep. 3, 2010

(65) Prior Publication Data

US 2012/0056612 A1    Mar. 8, 2012

(51) Int. Cl.
*G11B 21/02*    (2006.01)
*G11B 27/36*    (2006.01)

(52) U.S. Cl.
USPC ............................................... 360/75; 360/31

(58) Field of Classification Search
None
See application file for complete search history.

(56) References Cited

U.S. PATENT DOCUMENTS

| | | | |
|---|---|---|---|
| 4,715,257 A | 12/1987 | Endo et al. | |
| 4,777,544 A | 10/1988 | Brown et al. | |
| 5,086,475 A | 2/1992 | Kageyama et al. | |
| 5,111,727 A | 5/1992 | Rossum | |
| 5,377,058 A | 12/1994 | Good et al. | |
| 5,814,750 A | 9/1998 | Read et al. | |
| 6,519,102 B1 | 2/2003 | Smith et al. | |
| 6,937,424 B2 | 8/2005 | Chang et al. | |
| 7,038,875 B2 | 5/2006 | Lou et al. | |
| 7,158,325 B1 | 1/2007 | Hu et al. | |
| 7,199,956 B1 * | 4/2007 | Moser et al. | 360/46 |
| 8,300,349 B2 * | 10/2012 | Mathew et al. | 360/75 |
| 8,325,432 B2 * | 12/2012 | Mathew et al. | 360/31 |
| 2005/0046982 A1 | 3/2005 | Liu et al. | |
| 2007/0268615 A1 | 11/2007 | McFadyen et al. | |
| 2008/0018786 A1 | 1/2008 | Kageyama et al. | |
| 2009/0299666 A1 * | 12/2009 | Kang et al. | 702/77 |

FOREIGN PATENT DOCUMENTS

| | | |
|---|---|---|
| WO | WO 02/093546 | 11/2002 |
| WO | WO 2010/014078 | 2/2010 |

OTHER PUBLICATIONS

U.S. Appl. No. 12/669,483, filed Aug. 12, 2010, Graef, Nils.
U.S. Appl. No. 12/851,425, filed Aug. 5, 2010, Mathew et al.
U.S. Appl. No. 12/851,455, filed Aug. 5, 2010, Mathew et al.
U.S. Appl. No. 12/856,782, filed Aug. 16, 2010, Mathew et al.
Fertner, Antoni "Frequency-Domain Echo Canceller With Phase Adjustment" IEEE Transactions on circuits and Systems-II; Analog and Digital Signal Processing, vol. 44, No. 10, Oc.
Liu, et al., "Head Disk Spacing Variation Suppression via Active Flying Height Control" IEEE Instrumentation and Measurement Technology Conf. Budapest, Hungary May 21-23, 2001.

* cited by examiner

*Primary Examiner* — Regina N Holder
(74) *Attorney, Agent, or Firm* — Hamilton DeSanctis & Cha (57) ABSTRACT

Various embodiments of the present invention provide systems and methods for phase compensated harmonic sensing. For example, a circuit for harmonics calculation is disclosed that includes a phase difference estimation circuit and a phase offset compensation circuit. The harmonic calculation circuit is operable to calculate a first harmonic based on a periodic data pattern and a second harmonic based on the periodic data pattern. The phase difference estimation circuit operable to calculate a phase difference between the first harmonic and the second harmonic. The phase offset compensation circuit operable to align the second harmonic with the first harmonic to yield an aligned harmonic.

20 Claims, 7 Drawing Sheets

SYSTEMS AND METHODS FOR PHASE COMPENSATED HARMONIC SENSING IN FLY HEIGHT CONTROL

BACKGROUND OF THE INVENTION

The present inventions are related to systems and methods for transferring information to and from a storage medium, and more particularly to systems and methods for positioning a sensor in relation to a storage medium.

Various electronic storage media are accessed through use of a read/write head assembly that is positioned in relation to the storage medium. The read/write head assembly is supported by a head actuator, and is operable to read information from the storage medium and to write information to the storage medium. The distance between the read/write head assembly and the storage medium is typically referred to as the fly height. Control of the fly height is critical to proper operation of a storage system. In particular, increasing the distance between the read/write head assembly and the storage medium typically results in an increase in inter symbol interference. Where inter symbol interference becomes unacceptably high, it may become impossible to credibly read the information originally written to the storage medium. In contrast, a fly height that is too small can result in excess wear on the read/write head assembly and/or a premature crash of the storage device.

In a typical storage device, fly height is set to operate in a predetermined range. During operation, the fly height is periodically measured to assure that it continues to operate in the predetermined region. A variety of approaches for measuring fly height have been developed including optical interference, spectrum analysis of a read signal wave form, and measuring a pulse width value of the read signal. Such approaches in general provide a reasonable estimate of fly height, however, they are susceptible to various errors. Such errors require that the predetermined operating range of the fly height be maintained sufficiently large to account for the various errors. This may result in setting the fly height such that inter-symbol interference is too high undermining the data recovery performance of the storage system.

Hence, for at least the aforementioned reasons, there exists a need in the art for advanced systems and methods for positioning a sensor in relation to a storage medium.

BRIEF SUMMARY OF THE INVENTION

The present inventions are related to systems and methods for transferring information to and from a storage medium, and more particularly to systems and methods for positioning a sensor in relation to a storage medium.

Various embodiments of the present invention provide harmonics calculation circuits that include a harmonic calculation circuit, a phase difference estimation circuit and a phase offset compensation circuit. The harmonic calculation circuit is operable to calculate a first harmonic based on a periodic data pattern and a second harmonic based on the periodic data pattern. The phase difference estimation circuit operable to calculate a phase difference between the first harmonic and the second harmonic. The phase offset compensation circuit operable to align the second harmonic with the first harmonic to yield an aligned harmonic. In some instances, the circuit further includes an averaging circuit that is operable to calculate a harmonics average including at least the first harmonic and the aligned harmonic. In various instances, the circuit further includes a read/write head assembly disposed in relation to a storage medium. In such instances, the periodic data pattern is derived by the read/write head assembly from a user data region of the storage medium. In other instances, the periodic data pattern is derived by the read/write head assembly from a servo data region of the storage medium. In one particular case, the periodic data pattern is a burst demodulation pattern.

In some instances of the aforementioned embodiments, the first harmonic includes a first imaginary portion and a first real portion, and the second harmonic includes a second imaginary portion and a second real portion. In some cases, the phase difference estimation circuit is operable to calculate a real portion of the phase difference and an imaginary portion of the phase difference using the first real portion, first imaginary portion, second real portion and a second imaginary portion. In particular cases, the phase offset compensation circuit operable to align the second harmonic with the first harmonic based at least in part on the real portion of the phase difference and the imaginary portion of the phase difference.

Other embodiments of the present invention provides methods for harmonics calculation. The methods include providing a harmonics calculation circuit; receiving a first data set representing a periodic data from a first region of a storage medium; calculating a first harmonic based on the first data set; receiving a second data set representing the periodic data from a second region of the storage medium; calculating a second harmonic based on the second data set; and phase aligning the second harmonic and the first harmonic to yield a phase aligned harmonic. In some instances of the aforementioned embodiments, phase aligning the second harmonic and the first harmonic includes calculating a phase difference between the second harmonic and the first harmonic.

Yet other embodiments of the present invention provide storage devices that include a storage medium, a harmonic calculation circuit, a phase difference estimation circuit, and a phase offset compensation circuit. The storage medium includes at least a first region and a second region. The harmonic calculation circuit is operable to receive a first data set corresponding to a periodic data pattern derived from the first region and a second data set corresponding to the periodic data pattern derived from the second region, and to calculate a first harmonic based on a periodic data pattern and a second harmonic based on the periodic data pattern. The phase difference estimation circuit is operable to calculate a phase difference between the first harmonic and the second harmonic. The phase offset compensation circuit is operable to align the second harmonic with the first harmonic to yield an aligned harmonic.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 6b is a cross sectional view showing the relationship between the disk platter and the read/write head assembly of the storage device of FIG. 6a.

DETAILED DESCRIPTION OF THE INVENTION

The present inventions are related to systems and methods for transferring information to and from a storage medium, and more particularly to systems and methods for positioning a sensor in relation to a storage medium.

Figure 1A:
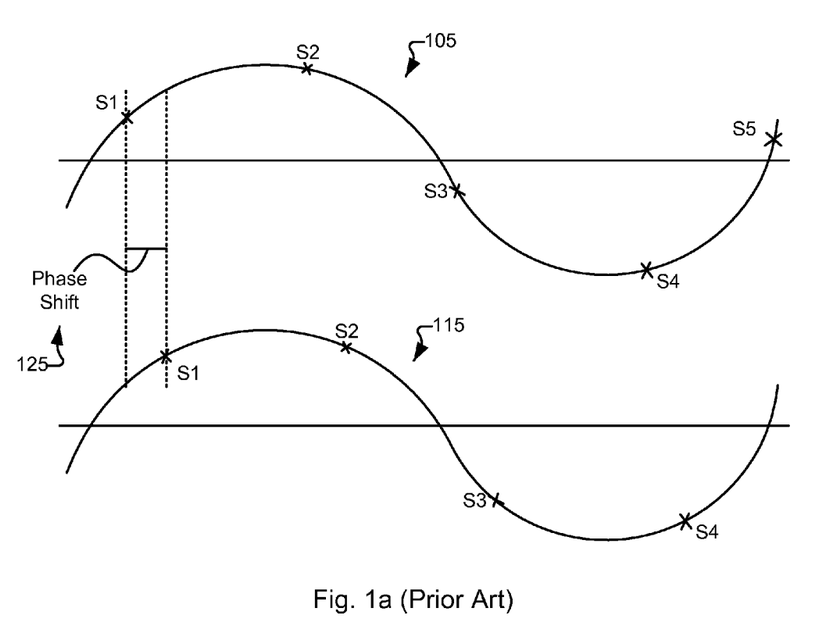
FIG. 1a depicts the sampling of corresponding periodic waveforms during two different sectors resulting in a phase offset between the samples of the respective periodic waveforms.

Turning to FIG. 1a, the sampling of corresponding periodic waveforms 105, 115 during two different sectors is graphically depicted. As shown, the two distinct samplings result in a phase offset between the samples of the respective periodic waveforms. In particular, an instance 105 of a periodic waveform is shown that has been sampled at five distinct points (S1, S2, S3, S4, S5). Subsequently, another instance 115 of the periodic waveform is sampled at four points (S1, S2, S3, S4) that correspond to the respective point of the same number at which instance 105 was sampled. As shown, there is a phase offset 125 between corresponding samples (i.e., S1) of instance 105 and instance 115. This phase offset may occur due to any number of reasons and results in incoherence of the data samples across multiple instances of a given periodic waveform. Such incoherence compromises harmonic calculations performed across multiple instances of the periodic waveform.

Figure 1B:
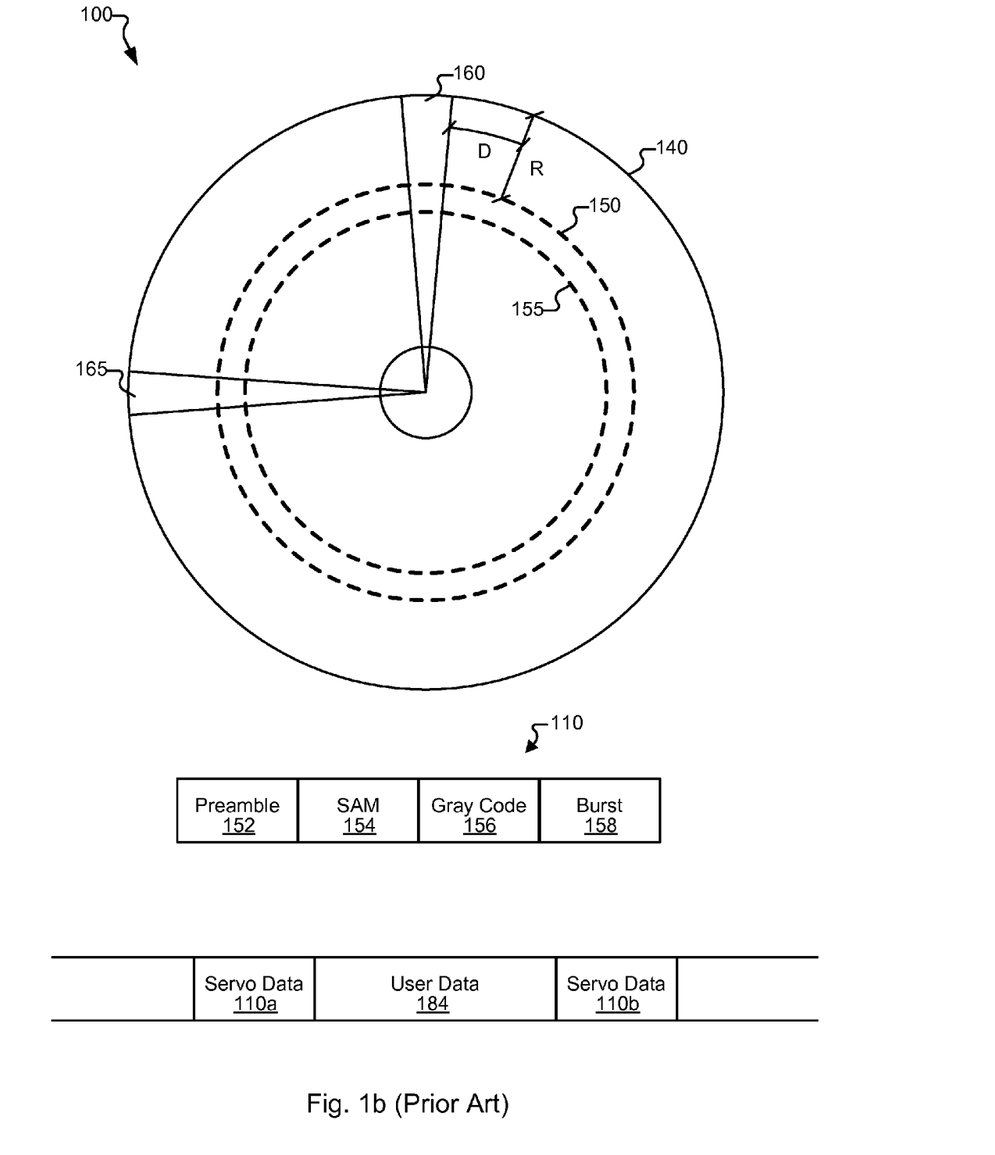
FIG. 1b depicts an existing storage device format that may be used in relation to different embodiments of the present invention.

FIG. 1b shows a storage medium 100 with two exemplary tracks 150, 155 indicated as dashed lines. The tracks are segregated by servo data written within wedges 160, 165. These wedges include data and supporting bit patterns 110 that are used for control and synchronization of the read/write head assembly over a desired location on storage medium 100. In particular, these wedges generally include a preamble pattern 152 followed by a servo address mark 154 (SAM). Servo address mark 154 is followed by a Gray code 156, and Gray code 156 is followed by burst information 158. It should be noted that while two tracks and two wedges are shown, hundreds of each would typically be included on a given storage medium. Further, it should be noted that a servo data set may have two or more fields of burst information. Yet further, it should be noted that different information may be included in the servo fields such as, for example, repeatable run-out information that may appear after burst information 158. Between the bit patterns 110, a user data region 184 is provided.

In some cases, instance 105 of the periodic waveform occurs during one user data region (e.g., user data region 184) of a track on a storage medium, and instance 115 of the periodic waveform occurs in a later user data region (e.g., user data region 184) of the same track on the storage medium. In other cases, instance 105 of the periodic waveform occurs during one servo data region (e.g., wedges 160, 165) of a track on a storage medium, and instance 115 of the periodic waveform occurs in a later servo data region (e.g., wedges 160, 165) of the same track on the storage medium.

Various embodiments of the present invention provide for estimating the phase offset between corresponding samples across instances of a given periodic waveform. The estimated phase offset is used to increase the coherence of corresponding samples allowing the use of multiple instances of a periodic waveform in calculating harmonics. Among various advantages, allowing the use of multiple instances of the periodic waveform may improve noise averaging where relatively short but recurring periodic waveforms are used for harmonics calculation. Where the accuracy of the resulting harmonics improves, a corresponding accuracy in a fly height calculated from the harmonics is also improved. Based upon the disclosure provided herein, one of ordinary skill in the art will recognize a variety of other advantages either in addition to or in place of the aforementioned advantage that may be achieved using different embodiments of the present invention.

Figure 2:
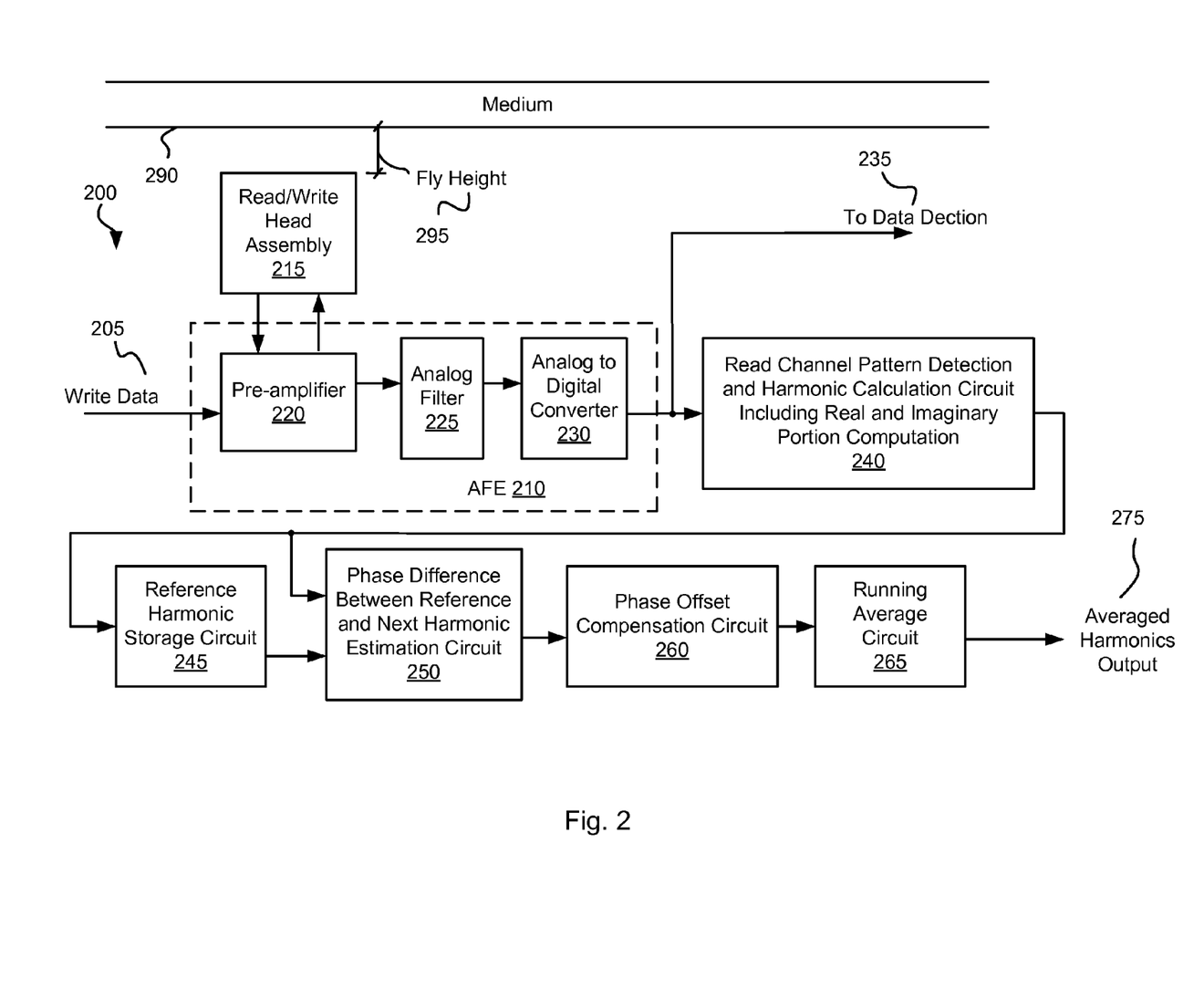
FIG. 2 depicts a phase compensated harmonics calculation circuit in accordance with one or more embodiments of the present invention.

Turning to FIG. 2, a phase compensated harmonics calculation circuit 200 is shown in accordance with one or more embodiments of the present invention. Phase compensated harmonics calculation circuit 200 includes an analog front end circuit 210. Analog front end circuit 210 may be any analog front end circuit known in the art. In the depicted embodiment, analog front end circuit 210 includes a pre-amplifier circuit 220, an analog filter circuit 225 and an analog to digital converter circuit 230. Pre-amplifier circuit 220 is electrically coupled to a read/write head assembly 215 that is disposed a fly height distance 295 from a storage medium 290.

In a read operation, read/write head assembly 215 senses magnetically represented information on medium 290, and converts the information into an electrical signal. The electrical signal is amplified by pre-amplifier circuit 220. The resulting amplified signal from pre-amplifier circuit 220 is provided to analog filter circuit 225 that provides a filtered output to analog to digital converter circuit 230. In response, analog to digital converter circuit 230 provides a series of digital samples corresponding to the received analog input. The series of digital samples are provided to a downstream data detection circuit 235, and to a read channel pattern detection and harmonic calculation circuit 240. In a write operation, a write data output 205 is provided to pre-amplifier circuit 220 that in turn provides an output corresponding to write data output 205 to read/write head assembly 215. Read/write head assembly 215 converts the received signal into magnetic information that is stored to medium 290.

Read channel pattern detection and harmonic calculation circuit 240 is operable to detect a periodic pattern incorporated in the series of digital samples from analog to digital converter circuit 230. For example, where the periodic pattern is written within user data regions of medium 290, read channel pattern detection and harmonic calculation circuit 240 utilizes various location information on medium 290 to determine when the periodic pattern has been found. This may include, for example, utilizing servo data to determine when a given user data has been detected and using one or more predefined fields in the user data region to indicate the periodic pattern. Based upon the disclosure provided herein, one of ordinary skill in the art will recognize a variety of approaches for identifying a periodic pattern on medium 290. As another example, the periodic pattern may be one or both of the preamble and burst information within the servo data region. In such a case, standard servo data processing may be used to detect the periodic pattern. As a particular example, where the periodic pattern is the burst pattern of the servo data, identification of the preceding preamble and servo address mark may be used to indicate the beginning of the burst pattern. Based upon the disclosure provided herein, one of ordinary skill in the art will recognize a variety of periodic patterns and identification thereof that may be used in relation to different embodiments of the present invention.

Once the periodic pattern is identified, read channel pattern detection and harmonic calculation circuit 240 performs a harmonic calculation. This calculation may be done consistent with any harmonic calculation known in the art. For example, the harmonic may be sensed/calculated in accordance with the circuits and processes disclosed in U.S. patent application Ser. No. 12/851,455 entitled "Systems and Methods for Servo Data Based Harmonics Calculation" and filed by Mathew et al. on Aug. 5, 2010. The entirety of the aforementioned reference is incorporated herein by reference for all purposes. Based upon the disclosure provided herein, one of ordinary skill in the art will recognize a variety of systems, circuits and methods known in the art that may be used for calculating harmonics in accordance with different embodiments of the present invention.

The aforementioned harmonic computation results in a real and an imaginary portion as set forth in the following equation for l-th harmonic of a periodic pattern with period N:

$$H_l = \sum_{n=0}^{N-1} x[n] \cdot c_l[n] - j \sum_{n=0}^{N-1} x[n] \cdot s_l[n]$$

where $$x[n] = \frac{1}{M} \sum_{m=0}^{M-1} y[n + mN].$$

Here, y[n] denotes M cycles of the samples of the periodic data from in a sector before averaging and x[n] denotes one cycle of these samples after averaging. Further, $$\sum_{n=0}^{N-1} x[n] \cdot c_l[n]$$

is the real portion, $$\sum_{n=0}^{N-1} x[n] \cdot s_l[n]$$

is the imaginary portion, l denotes the harmonic index, and $c_l[n]$ and $s_l[n]$ are parameters chosen based upon the periodicity of the periodic pattern.

Where the calculated harmonic is selected as an initial harmonic, a discrete Fourier transform of the harmonic is stored as a reference harmonic to a storage circuit 245. In particular, the aforementioned real and imaginary portions of the calculated harmonic are stored. This stored initial harmonic is considered to have a zero phase offset. Selecting the calculated harmonic may be based on the first harmonic since startup, or may be updated periodically. Based on the disclosure provided herein, one of ordinary skill in the art will appreciate a variety of different ways that a reference harmonic may be selected for use in relation to different embodiments of the present invention.

Where the calculated harmonic is not the initial harmonic, the calculated harmonic is provided to an estimation circuit 250 that estimates a phase difference between the previously stored reference harmonic and the newly calculated harmonic (i.e., the harmonic from k-th read-event or sector). As an example, assume the first and third harmonics are computed as follows:

$$X[k,l] = X_r[k,l] + jX_i[k,l], \text{ for } k=1, 2, \ldots, M \text{ and } l=1, 3,$$

and where $\{X_r[k,l], X_i[k,l]\}$ are the real and imaginary parts of the l-th harmonic of the k-th read event. In this case, the estimated phase difference of the l-th harmonic of the k-th read event is calculated in accordance with the following equation:

$$\varphi[k, l] = \frac{\Theta[k, l]}{|\Theta[k, l]|} = \varphi_r[k, l] + j\varphi_i[k, l], \text{ with } \Theta[k, l] = \frac{X[k, l]}{X[1, l]}.$$

In this case, $$\varphi_r[k, l] = \frac{X_r[k, l] \cdot X_r[1, l] + X_i[k, l] \cdot X_i[1, l]}{\beta[k, l]},$$

$$\varphi_i[k, l] = \frac{X_i[k, l] \cdot X_r[1, l] - X_r[k, l] \cdot X_i[1, l]}{\beta[k, l]}, \text{ and}$$

$$\beta[k, l] = |X[1, l]| \cdot |X[k, l]|$$
$$= \sqrt{X_r^2[1, l] + X_i^2[1, l]} \sqrt{X_r^2[k, l] + X_i^2[k, l]}.$$

The aforementioned estimated phase difference is provided from estimation circuit 250 to a phase offset compensation circuit 260. Phase offset compensation circuit 260 uses the estimated phase difference to align or rotate the recently calculated harmonics into phase with the initial reference harmonic from storage circuit 245 in accordance with the following equation:

$$\tilde{X}_k[k, l] = \phi^*[k, l] \cdot X[k, l]$$
$$= (\phi_r[k, l] \cdot X_r[k, l] + \phi_i[k, l] \cdot X_i[k, l]) +$$
$$j(\phi_r[k, l] \cdot X_i[k, l] - \phi_i[k, l] \cdot X_r[k, l]).$$

Various embodiments of the present invention combine the processes of both estimation circuit 250 and phase offset compensation circuit 260 in a combination circuit (not shown as a combination) that uses the same inputs as described in relation to estimation circuit 250 to yield an aligned output in accordance with the following equation:

$$\tilde{X}_k[k,l] = \frac{\Theta^*[k,l]}{|\Theta[k,l]|} \cdot X[k,l] = \frac{X[1,l]}{|X[1,l]|} \cdot |X[k,l]|.$$

The aforementioned phase aligned harmonic value is provided to a running average circuit 265. Running average circuit 265 averages a number of phase compensated harmonics. Such averaging operates to reduce noise characteristics of the calculated harmonics. In one particular embodiment of the present invention, harmonic calculations for forty or more regions are averaged together in the running average. Accumulating the phase aligned harmonics over several read events (i.e., sectors), running average circuit 265 provides an output consistent with the following equation:

$$\sum_k \tilde{X}_k[k,l] = \frac{X[1,l]}{|X[1,l]|} \cdot \sum_k |X[k,l]|$$

$$= \frac{X_r[1,l] + jX_i[1,l]}{\sqrt{X_r^2[1,l] + X_i^2[1,l]}} \cdot \sum_k \sqrt{X_r^2[k,l] + X_i^2[k,l]}.$$

The above mentioned output is then divided by the number of constituent elements (k) to yield an average harmonics output. The average harmonics output is provided as an averaged output 275. Based upon the disclosure provided herein, one of ordinary skill in the art will recognize other numbers of harmonics that may be included in averaged output 275. Averaged output 275 may be provided to a fly height calculation circuit as are known in the art. Based upon the disclosure provided herein, one of ordinary skill in the art will recognize a variety of other uses for averaged output 275.

As the aforementioned accumulation of phase aligned harmonics over several sectors and multiplying the accumulated value by the reference harmonic to a storage circuit 245 uses one square root function and two multiplications for each harmonic calculated in relation to each sector, some embodiments of the present invention utilize one or more simplifications operable to yield less complex circuitry. As a first level of simplification, normalization of the phase factor is eliminated while computing the phase difference of the l-th harmonic in the k-th sector with respect to the $1^{st}$ sector in accordance with the following equation:

$$\Phi[k,l] = \Theta[k,l] = \frac{X[k,l]}{X[1,l]} = \frac{X[k,l] \cdot X*[1,l]}{|X[1,l]|^2}.$$

As another level of simplification, the squaring and division operations may also be eliminated while computing the phase difference in accordance with the following equations:

$$\hat{\Phi}[k,l] = X[k,l] \cdot X^*[1,l] = \hat{\Phi}_r[k,l] + j\hat{\Phi}_i[k,l],$$

where $$\hat{\Phi}_r[k,l] = X_r[k,l] \cdot X_r[1,l] + X_i[k,l] \cdot X_i[1,l], \text{ and}$$

$$\hat{\Phi}_i[k,l] = X_i[k,l] \cdot X_r[1,l] - X_r[k,l] \cdot X_i[1,l].$$

From this, the real and imaginary parts of the phase aligned l-th harmonic of the k-th sector may be written as follows:

$$\hat{X}[k,l] = \hat{\Phi}^*[k,l] \cdot X[k,l] = \hat{X}_r[k,l] + j\hat{X}_i[k,l],$$

where $$\hat{X}_r[k,l] = \hat{\Phi}_r[k,l] \cdot X_r[k,l] + \hat{\Phi}_i[k,l] \cdot X_i[k,l], \text{ and}$$

$$\hat{X}_i[k,l] = \hat{\Phi}_r[k,l] \cdot X_i[k,l] - \hat{\Phi}_i[k,l] \cdot X_r[k,l].$$

Using the aforementioned simplifications, a combination of estimation circuit 250 and phase offset compensation circuit 260 provides a phase compensated version of the newly calculated harmonic (i.e., the harmonic in k-th read-event or sector) in accordance with the following equation:

$$\hat{X}[k,l] = X[1,l] \cdot |X[k,l]|^2,$$

where X[1,l] is the output of reference harmonic storage circuit 245. Therefore, the accumulation process performed by running average circuit 265 can be reduced in accordance with the following equation:

$$\sum_k \hat{X}_k[k,l] = X[1,l] \cdot \sum_k |X[k,l]|^2$$

$$= (X_r[1,l] + jX_i[1,l]) \cdot \sum_k (X_r^2[k,l] + X_i^2[k,l]).$$

Such a simplification saves at least one square root function per calculated harmonic per sector.

An additional scale factor may be used in relation to both the real and imaginary portions of the phase aligned harmonics. This scale factor may be accounted for when utilizing the resulting average output 275 in relation to determining fly height or another purpose. This scale factor can be obtained by relating the phase aligned harmonics in exact and approximate approaches as follows:

$$\tilde{X}[k,l] = \frac{X[1,l]}{|X[1,l]|} \cdot X[k,l] \ \& \ \hat{X}[k,l] = X[1,l] \cdot |X[k,l]|^2.$$

Therefore, $$\hat{X}[k,l] = \left\{ \frac{X[1,l]}{|X[1,l]|} \cdot |X[k,l]| \right\} \cdot \{|X[k,l]| \cdot |X[1,l]|\}$$

$$= \tilde{X}[k,l] \cdot \{|X[k,l]| \cdot |X[1,l]|\}.$$

From this it follows that:

$$|\hat{X}[k,l]|^2 \propto |X[k,l]|^6.$$

Therefore, the harmonic value that may be used in relation to calculating fly height based upon average output 275 when harmonic computations are done using the simplified approach presented above is:

$$\frac{10 \log_{10} |\hat{X}[k,l]|^2}{3}.$$

Figure 3:
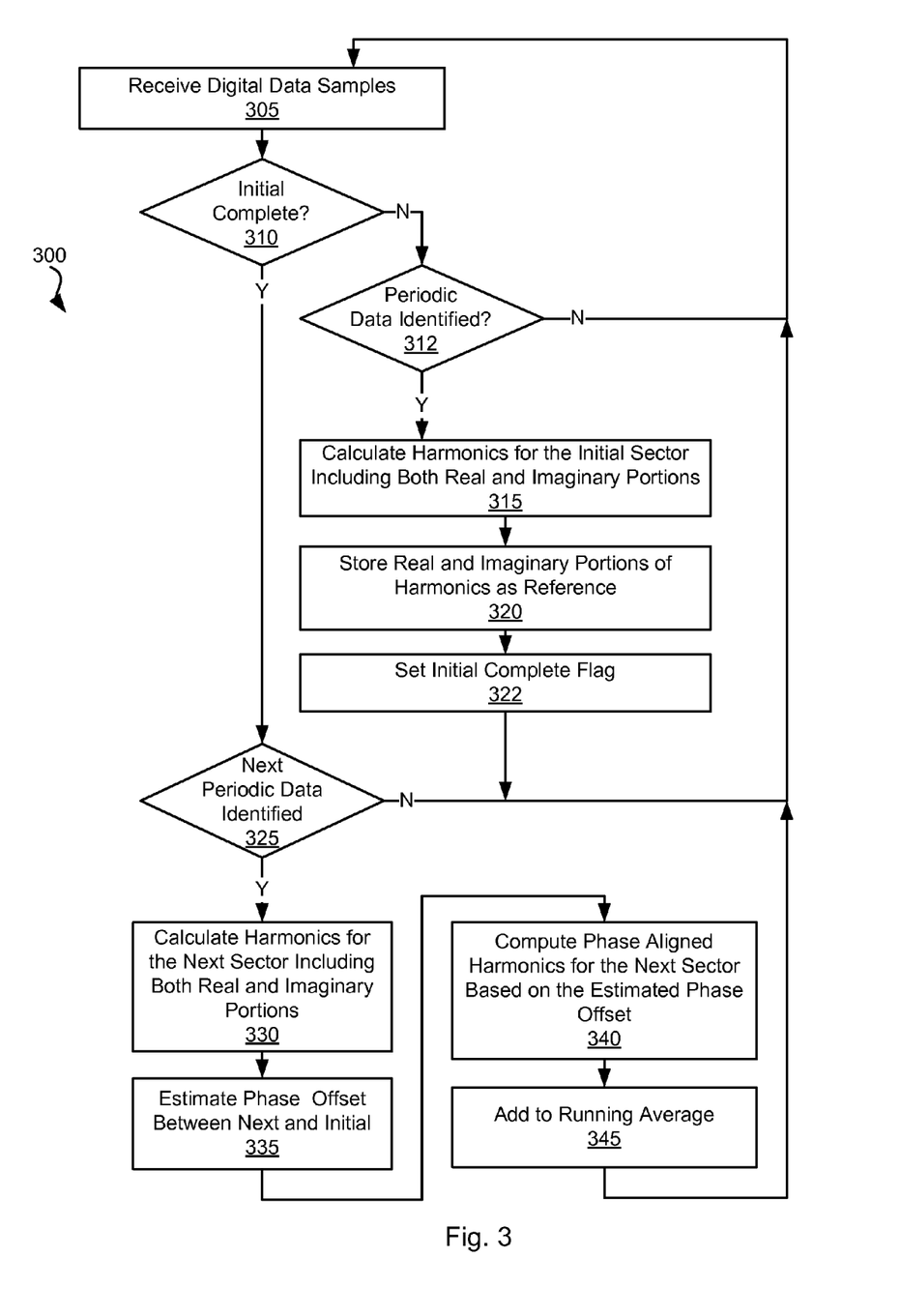
FIG. 3 is a flow diagram depicting a method in accordance with some embodiments of the present invention for phase compensated harmonics calculation.

Turning to FIG. 3, a flow diagram 300 depicts a method in accordance with some embodiments of the present invention for phase compensated harmonics calculation. Following flow diagram 300, a series of digital samples is continuously received (block 305). This series of digital samples may be received for example, from an analog to digital converter circuit that is converting an analog signal corresponding to information derived from a storage medium. It is determined whether an initial harmonics calculation has been completed (block 310). The initial harmonic calculations are considered to have a phase offset of zero. Later harmonics are phase aligned to this initial harmonics calculation.

Where an initial harmonics calculation has not yet been calculated (block 310), it is determined whether a predefined periodic data pattern is found in the received digital samples (block 312). The periodic pattern may be part of data received from a user data region of a storage medium or may be part of the data received from a servo data region. In one particular instance, the periodic pattern is the burst demodulation information included as part of the servo data. Based upon the disclosure provided herein, one of ordinary skill in the art will recognize a variety of approaches for identifying a periodic pattern within the received digital data samples, and various locations on a storage medium from which the periodic data pattern may be derived. Where a periodic data pattern has not yet been identified (block 312), additional data samples are received (block 305) and the process of searching for the periodic data continues.

Alternatively, where the predefined periodic data pattern is identified (block 312), a harmonics calculation is performed on the periodic data for the initial sector (block 315). This harmonics calculation may be done consistent with any harmonic calculation known in the art. For example, the harmonic may be sensed/calculated in accordance with the circuits and processes disclosed in U.S. patent application Ser. No. 12/851,455 entitled "Systems and Methods for Servo Data Based Harmonics Calculation" and filed by Mathew et al. on Aug. 5, 2010. Based upon the disclosure provided herein, one of ordinary skill in the art will recognize a variety of systems, circuits and methods known in the art that may be used for calculating harmonics in accordance with different embodiments of the present invention.

The aforementioned computation results in a real and an imaginary portion as set forth in the following equation:

$$X[1, l] = \sum_{n=0}^{N-1} x_1[n] \cdot c_l[n] - j \sum_{n=0}^{N-1} x_1[n] \cdot s_l[n],$$

where $x_l[n]$ for $n=0, 1, \ldots, N-1$, denote the periodic pattern averaged over the first sector, $$\sum_{n=0}^{N-1} x_1[n] \cdot c_l[n]$$

is the real portion, $$\sum_{n=0}^{N-1} x_1[n] \cdot s_l[n]$$

is the imaginary portion, and $c_l[n]$ and $s_l[n]$ are parameters chosen based upon the periodicity of the periodic pattern. The real and imaginary portions of the calculated harmonics are stored (block 320) and a flag indicating that the initial harmonics calculation is complete and stored is set (block 322). Again, the initial harmonic calculations are considered to have a phase offset of zero. Later harmonics are phase aligned to this initial harmonics calculation that is stored.

Alternatively, where an initial harmonics calculation has been calculated (block 310), it is determined whether a subsequent instance of the predefined periodic data pattern is found in the received digital samples (block 325). Again, the periodic pattern may be part of data received from a user data region of a storage medium or may be part of the data received from a servo data region. In one particular instance, the periodic pattern is the burst demodulation information included as part of the servo data. Based upon the disclosure provided herein, one of ordinary skill in the art will recognize a variety of approaches for identifying a periodic pattern within the received digital data samples, and various locations on a storage medium from which the periodic data pattern may be derived. Where a subsequent instance of the periodic data pattern has not yet been identified (block 325), additional data samples are received (block 305) and the process of searching for the periodic data continues.

Alternatively, where a subsequent instance of the predefined periodic data pattern is identified (block 325), a harmonics calculation is performed on the periodic data for the subsequent sector from which the periodic data was derived (block 330). As with the initial harmonics calculation, the calculation may be done consistent with any harmonic calculation known in the art. For example, the harmonic may be sensed/calculated in accordance with the circuits and processes disclosed in U.S. patent application Ser. No. 12/851, 455 entitled "Systems and Methods for Servo Data Based Harmonics Calculation" and filed by Mathew et al. on Aug. 5, 2010. Based upon the disclosure provided herein, one of ordinary skill in the art will recognize a variety of systems, circuits and methods known in the art that may be used for calculating harmonics in accordance with different embodiments of the present invention.

The aforementioned computation results in a real and an imaginary portion as set forth in the following equation:

$$X[k, l] = \sum_{n=0}^{N-1} x_1[n] \cdot c_l[n] - j \sum_{n=0}^{N-1} x_k[n] \cdot s_l[n],$$

where $X_k[n]$ for $n=0, 1, \ldots, N-1$, denote the periodic pattern averaged over the k-th sector, $$\sum_{n=0}^{N-1} x_k[n] \cdot c_l[n]$$

is the real portion, $$\sum_{n=0}^{N-1} x_k[n] \cdot s_l[n]$$

is the imaginary portion, and $c_l[n]$ and $s_l[n]$ are parameters chosen based upon the periodicity of the periodic pattern.

Next, an estimate of the phase difference between the initial harmonics value and the recently calculated harmonics value (i.e., the k-th harmonic) (block 335). As an example, assume the first and third harmonics are computed as follows:

$$X[k,l]=X_r[k,l]+jX_i[k,l], \text{ for } l=1, 3,$$

and where $\{X_r[k,l], X_i[k,l]\}$ are the real and imaginary parts of the l-th harmonic of the k-th read event. In this case, the estimated phase difference of the l-th harmonic of the k-th read event is calculated in accordance with the following equation:

$$\varphi[k, l] = \frac{\Theta[k, l]}{|\Theta[k, l]|} = \varphi_r[k, l] + j\varphi_i[k, l], \text{ with}$$

$$\Theta[k, l] = \frac{X[k, l]}{X[1, l]}.$$

In this case, $$\varphi_r[k, l] = \frac{X_r[k, l] \cdot X_r[1, l] + X_i[k, l] \cdot X_i[1, l]}{\beta[k, l]},$$

$$\varphi_i[k, l] = \frac{X_i[k, l] \cdot X_r[1, l] - X_r[k, l] \cdot X_i[1, l]}{\beta[k, l]}, \text{ and}$$

$$\beta[k, l] = |X[1, l]| \cdot |X[k, l]|$$
$$= \sqrt{X_r^2[1, l] + X_i^2[1, l]} \sqrt{X_r^2[k, l] + X_i^2[k, l]}.$$

The aforementioned estimated phase difference is utilized to compute phase aligned harmonics for the currently processing sector (block 340). Such phase aligned harmonics may be calculated in accordance with the following equation:

$$\tilde{X}_k[k, l] = \phi^*[k, l] \cdot X[k, l]$$
$$= (\phi_r[k, l] \cdot X_r[k, l] + \phi_i[k, l] \cdot X_i[k, l]) +$$
$$j(\phi_r[k, l] \cdot X_i[k, l] - \phi_i[k, l] \cdot X_r[k, l]).$$

The aforementioned phase aligned harmonic value is then incorporated in a running average value (block 345). Such averaging operates to reduce noise characteristics of the calculated harmonics. In one particular embodiment of the present invention, harmonic calculations for forty or more regions are averaged together in the running average. The aforementioned phase aligned harmonic is equivalent to:

$$\tilde{X}_k[k, l] = \frac{\Theta^*[k, l]}{|\Theta[k, l]|} \cdot X[k, l] = \frac{X[1, l]}{|X[1, l]|} \cdot |X[k, l]|.$$

Therefore, accumulating the phase aligned harmonics over several read events (i.e., sectors), the resulting running average is consistent with the following equation:

$$\sum_k \tilde{X}_k[k, l] = \frac{X[1, l]}{|X[1, l]|} \cdot \sum_k |X[k, l]|$$
$$= \frac{X_r[1, l] + jX_i[1, l]}{\sqrt{X_r^2[1, l] + X_i^2[1, l]}} \cdot \sum_k \sqrt{X_r^2[k, l] + X_i^2[k, l]}.$$

The above mentioned output is then divided by the number of constituent elements (k) to yield an average harmonics output. Based upon the disclosure provided herein, one of ordinary skill in the art will recognize other numbers of harmonics that may be included in averaged output. The resulting averaged output may be provided to a fly height calculation circuit as are known in the art. Based upon the disclosure provided herein, one of ordinary skill in the art will recognize a variety of other uses for the averaged output.

Figure 4:
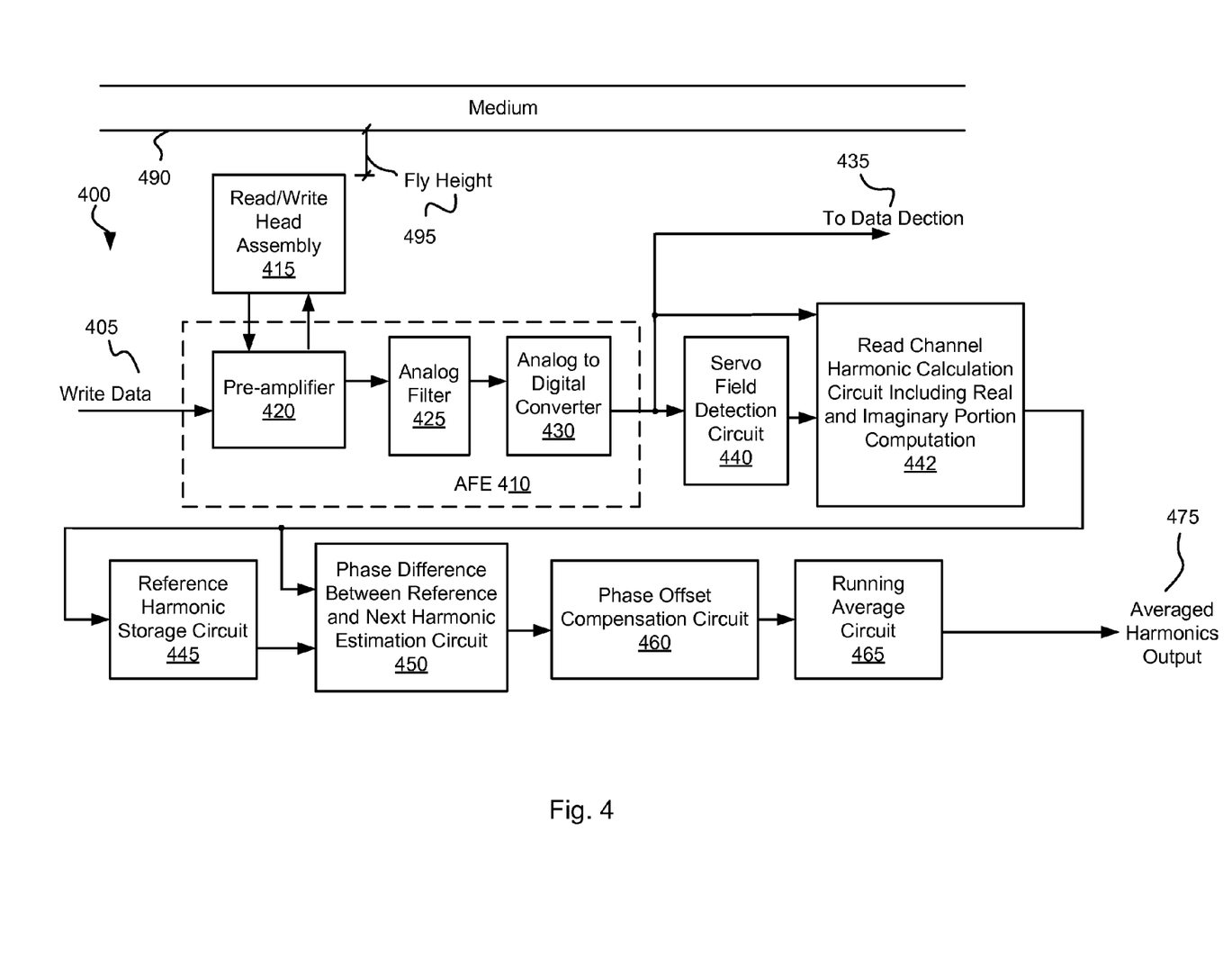
FIG. 4 depicts a phase compensated harmonics calculation circuit in accordance with one or more embodiments of the present invention relying on periodic patterns derived from servo data.

FIG. 4 depicts a phase compensated harmonics calculation circuit 400 in accordance with one or more embodiments of the present invention relying on periodic patterns derived from servo data. Phase compensated harmonics calculation circuit 400 includes an analog front end circuit 410. Analog front end circuit 410 may be any analog front end circuit known in the art. In the depicted embodiment, analog front end circuit 410 includes a pre-amplifier circuit 420, an analog filter circuit 425 and an analog to digital converter circuit 430. Pre-amplifier circuit 420 is electrically coupled to a read/write head assembly 415 that is disposed a fly height distance 495 from a storage medium 490.

In a read operation, read/write head assembly 415 senses magnetically represented information on medium 490, and converts the information into an electrical signal. The electrical signal is amplified by pre-amplifier circuit 420. The resulting amplified signal from pre-amplifier circuit 420 is provided to analog filter circuit 425 that provides a filtered output to analog to digital converter circuit 430. In response, analog to digital converter circuit 430 provides a series of digital samples corresponding to the received analog input. The series of digital samples are provided to a downstream data detection circuit 435, and to a read channel pattern detection and harmonic sensor circuit 442 through a servo field detector circuit 440. In a write operation, a write data output 405 is provided to pre-amplifier circuit 420 that in turn provides an output corresponding to write data output 405 to read/write head assembly 415. Read/write head assembly 415 converts the received signal into magnetic information that is stored to medium 490.

A servo filed detection circuit 440 monitors the received samples from analog front end circuit 410 looking for servo data as is known in the art. Servo field detection circuit 440 may be any circuit known in the art that is capable of detecting and processing servo data from a storage medium. In the case where burst demodulation data from the servo data field is used to calculate harmonics values, servo field detection circuit 440 asserts a field found output high whenever the burst demodulation field is identified. This output is provided as an enable input to a read channel harmonic calculation circuit 442 including real and imaginary computation circuitry.

Read channel harmonic calculation circuit 442 is operable to calculate harmonics using samples received when the field found output is asserted by servo field detection circuit 440. This calculation may be done consistent with any harmonic calculation known in the art. For example, the harmonic may be sensed/calculated in accordance with the circuits and processes disclosed in U.S. patent application Ser. No. 12/851,455 entitled "Systems and Methods for Servo Data Based Harmonics Calculation" and filed by Mathew et al. on Aug. 5, 2010. Based upon the disclosure provided herein, one of ordinary skill in the art will recognize a variety of systems, circuits and methods known in the art that may be used for calculating harmonics in accordance with different embodiments of the present invention.

The aforementioned harmonic computation results in a real and an imaginary portion as set forth in the following equation for l-th harmonic of a periodic pattern with period N:

$$H_l = \sum_{n=0}^{N-1} x[n] \cdot c_l[n] - j \sum_{n=0}^{N-1} x[n] \cdot s_l[n]$$

where $$x[n] = \frac{1}{M} \sum_{m=0}^{M-1} y[n + mN].$$

Here, y[n] denotes M cycles of the samples of the periodic data from in a sector before averaging and x[n] denotes one cycle of these samples after averaging. Further, $$\sum_{n=0}^{N-1} x[n] \cdot c_l[n]$$

is the real portion, $$\sum_{n=0}^{N-1} x[n] \cdot s_l[n]$$

is the imaginary portion, l denotes the harmonic index, and $c_l[n]$ and $s_l[n]$ are parameters chosen based upon the periodicity of the periodic pattern.

Where the calculated harmonic is selected as an initial harmonic, a discrete Fourier transform of the harmonic is stored as a reference harmonic to a storage circuit 445. In particular, the aforementioned real and imaginary portions of the calculated harmonic are stored. This stored initial harmonic is considered to have a zero phase offset. Selecting the calculated harmonic may be based on the first harmonic since startup, or may be updated periodically. Based on the disclosure provided herein, one of ordinary skill in the art will appreciate a variety of different ways that a reference harmonic may be selected for use in relation to different embodiments of the present invention.

Where the calculated harmonic is not the initial harmonic, the calculated harmonic is provided to an estimation circuit 450 that estimates a phase difference between the previously stored reference harmonic and the newly calculated harmonic (i.e., the harmonic in k-th read-event or sector). As an example, assume the first and third harmonics are computed as follows:

$$X[k,l] = X_r[k,l] + jX_i[k,l], \text{ for } l = 1, 3,$$

and where $\{X_r[k,l], X_i[k,l]\}$ are the real and imaginary parts of the l-th harmonic of the k-th read event. In this case, the estimated phase difference of the l-th harmonic of the k-th read event is calculated in accordance with the following equation:

$$\varphi[k, l] = \frac{\Theta[k, l]}{|\Theta[k, l]|} = \varphi_r[k, l] + j\varphi_i[k, l], \text{ with}$$

$$\Theta[k, l] = \frac{X[k, l]}{X[1, l]}.$$

In this case, $$\varphi_r[k, l] = \frac{X_r[k, l] \cdot X_r[1, l] + X_i[k, l] \cdot X_i[1, l]}{\beta[k, l]},$$

$$\varphi_i[k, l] = \frac{X_i[k, l] \cdot X_r[1, l] - X_r[k, l] \cdot X_i[1, l]}{\beta[k, l]}, \text{ and}$$

$$\beta[k, l] = |X[1, l]| \cdot |X[k, l]|$$
$$= \sqrt{X_r^2[1, l] + X_i^2[1, l]} \sqrt{X_r^2[k, l] + X_i^2[k, l]}.$$

The aforementioned estimated phase difference is provided from estimation circuit 450 to a phase offset compensation circuit 460. Phase offset compensation circuit 460 uses the estimated phase difference to align or rotate the recently calculated harmonics into phase with the initial reference harmonic from storage circuit 445 in accordance with the following equation:

$$\tilde{X}_k[k, l] = \varphi^*[k, l] \cdot X[k, l]$$
$$= (\varphi_r[k, l] \cdot X_r[k, l] + \varphi_i[k, l] \cdot X_i[k, l]) +$$
$$j(\varphi_r[k, l] \cdot X_i[k, l] - \varphi_i[k, l] \cdot X_r[k, l]).$$

The aforementioned phase aligned harmonic value is provided to a running average circuit 465. Running average circuit 465 averages a number of phase compensated harmonics. Such averaging operates to reduce noise characteristics of the calculated harmonics. In one particular embodiment of the present invention, harmonic calculations for forty or more regions are averaged together in the running average. The aforementioned phase aligned harmonic is equivalent to:

$$\tilde{X}_k[k, l] = \frac{\Theta^*[k, l]}{|\Theta[k, l]|} \cdot X[k, l] = \frac{X[1, l]}{|X[1, l]|} \cdot |X[k, l]|.$$

Therefore, accumulating the phase aligned harmonics over several read events (i.e., sectors), running average circuit 465 provides an output consistent with the following equation:

$$\sum_k \tilde{X}_k[k, l] = \frac{X[1, l]}{|X[1, l]|} \cdot \sum_k |X[k, l]|$$
$$= \frac{X_r[1, l] + jX_i[1, l]}{\sqrt{X_r^2[1, l] + X_i^2[1, l]}} \cdot \sum_k \sqrt{X_r^2[k, l] + X_i^2[k, l]}.$$

The above mentioned output is then divided by the number of constituent elements (k) to yield an average harmonics output. The average harmonics output is provided as an averaged output 475. Based upon the disclosure provided herein, one of ordinary skill in the art will recognize other numbers of harmonics that may be included in averaged output 475. Averaged output 475 may be provided to a fly height calculation circuit as are known in the art. Based upon the disclosure provided herein, one of ordinary skill in the art will recognize a variety of other uses for averaged output 475.

As the aforementioned accumulation of phase aligned harmonics over several sectors and multiplying the accumulated value by the reference harmonic to a storage circuit 445 uses one square root function and two multiplications for each harmonic calculated in relation to each sector, some embodiments of the present invention utilize one or more simplifications operable to yield less complex circuitry. As a first level of simplification, normalization of the phase factor is eliminated while computing the phase difference of the l-th harmonic in the k-th sector with respect to the 1$^{st}$ sector in accordance with the following equation:

$$\hat{\Phi}[k,l] = \Theta[k,l] = \frac{X[k,l]}{X[1,l]} = \frac{X[k,l] \cdot X*[1,l]}{|X[1,l]^2|}.$$

As another level of simplification, the squaring and division operations may also be eliminated while computing the phase difference in accordance with the following equation:

$$\hat{\Phi}[k,l] = X[k,l] \cdot X*[1,l] = \hat{\Phi}_r[k,l] + j\hat{\Phi}_i[k,l],$$

where $$\hat{\Phi}_r[k,l] = X_r[k,l] \cdot X_r[1,l] + X_i[k,l] \cdot X_i[1,l], \text{ and}$$

$$\hat{\Phi}_i[k,l] = X_i[k,l] \cdot X_r[1,l] - X_r[k,l] \cdot X_i[1,l].$$

From this, the real and imaginary parts of the phase aligned l-th harmonic of the k-th sector may be written as follows:

$$\hat{X}[k,l] = \hat{\Phi}*[k,l] \cdot X[k,l] = \hat{X}_r[k,l] + j\hat{X}_i[k,l],$$

where $$\hat{X}_r[k,l] = \hat{\Phi}_r[k,l] \cdot X_r[k,l] + \hat{\Phi}_i[k,l] \cdot X_i[k,l], \text{ and}$$

$$\hat{X}_i[k,l] = \hat{\Phi}_r[k,l] \cdot X_i[k,l] - \hat{\Phi}_i[k,l] \cdot X_r[k,l].$$

Using the aforementioned simplifications, a combination of estimation circuit 450 and phase offset compensation circuit 460 provides a phase compensated version of the newly calculated harmonic (i.e., the harmonic in k-th read-event or sector) in accordance with the following equation:

$$\hat{X}[k,l] = X[1,l] \cdot |X[k,l]|^2.$$

Therefore, the accumulation process performed by running average circuit 465 can be reduced in accordance with the following equation:

$$\sum_k \hat{X}_k[k,l] = X[1,l] \cdot \sum_k |X[k,l]|^2$$

$$= (X_r[1,l] + jX_i[1,l]) \cdot \sum_k (X_r^2[k,l] + X_i^2[k,l]).$$

Such a simplification saves at least one square root function per calculated harmonic per sector.

An additional scale factor may be used in relation to both the real and imaginary portions of the phase aligned harmonics. This scale factor may be accounted for when utilizing the resulting average output 475 in relation to determining fly height or another purpose. This scale factor can be obtained by relating the phase aligned harmonics in exact and approximate approaches as follows:

$$\tilde{X}[k,l] = \frac{X[1,l]}{|X[1,l]|} \cdot X[k,l] \;\&\; \hat{X}[k,l] = X[1,l] \cdot |X[k,l]|^2.$$

Therefore, $$\hat{X}[k,l] = \left\{ \frac{X[1,l]}{|X[1,l]|} \cdot |X[k,l]| \right\} \cdot \{|X[k,l]| \cdot |X[1,l]|\}$$

$$= \tilde{X}[k,l] \cdot \{|X[k,l]| \cdot |X[1,l]|\}.$$

From this it follows that:

$$|\hat{X}[k,l]|^2 \propto |X[k,l]|^6.$$

Therefore, the harmonic value that may be used in relation to calculating fly height based upon average output 475 when harmonic computations are done using the simplified approach presented above is:

$$\frac{10 \log_{10} |\hat{X}[k,l]|^2}{3}.$$

Figure 5:
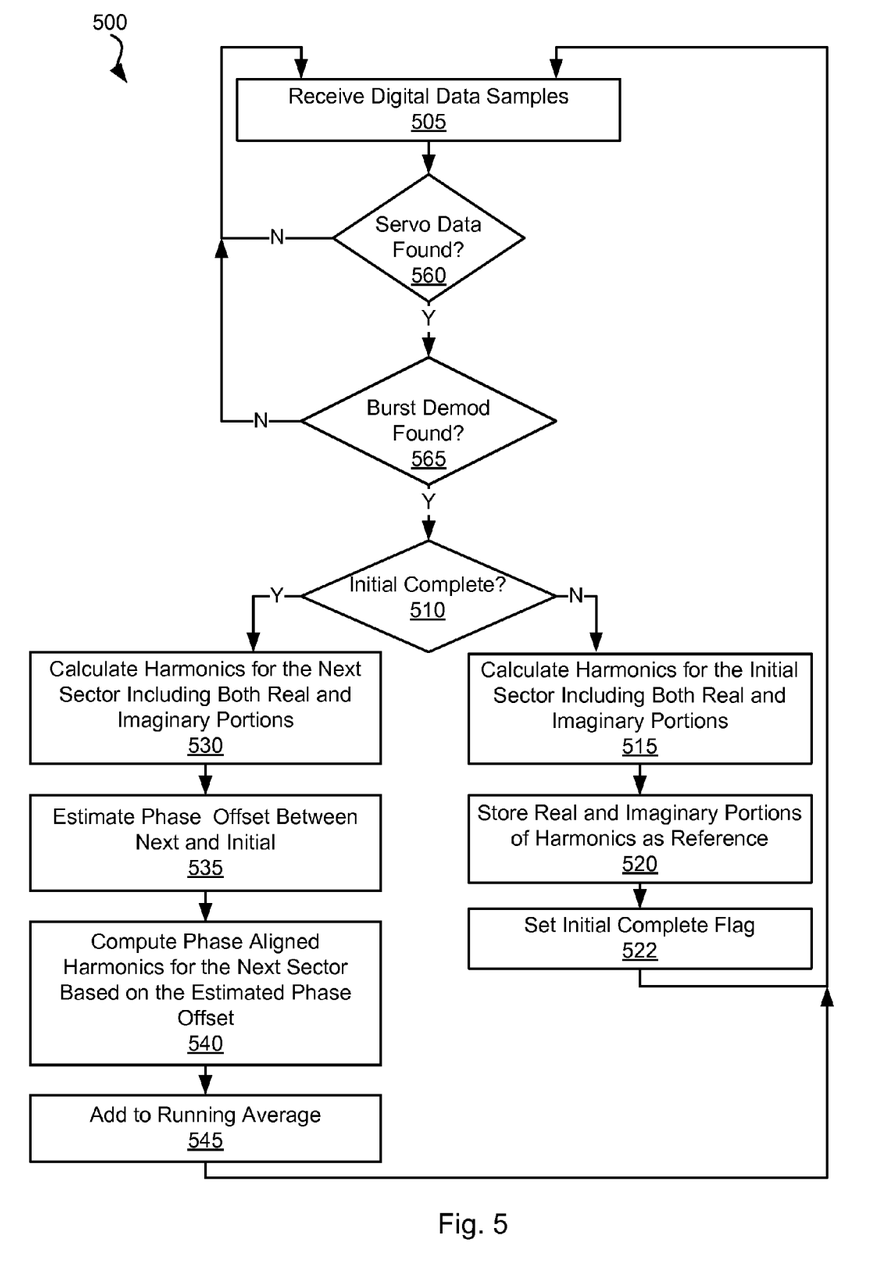
FIG. 5 is a flow diagram depicting a method in accordance with some embodiments of the present invention for phase compensated harmonics calculation relying on periodic patterns derived from servo data.

Turning to FIG. 5, a flow diagram 500 depicts a method in accordance with some embodiments of the present invention for phase compensated harmonics calculation relying on periodic patterns derived from servo data. It should be noted that the method of FIG. 5 is specific to servo data, but that the processes of the method may be equally applicable to periodic data from either or both of a servo data region or a user data region. Following flow diagram 500, a series of digital samples is continuously received (block 505). This series of digital samples may be received for example, from an analog to digital converter circuit that is converting an analog signal corresponding to information derived from a storage medium. It is determined whether servo data has been identified in the series of digital samples (block 560). This determination may be done using any approach known in the art and may include, for example, identifying a preamble within the identified servo data. Where a servo data region has been found (block 560), it is determined whether the burst demodulation data within the servo data region is being received (block 565).

Where the burst demodulation data is being received (block 565), it is determined whether an initial harmonics calculation has been completed (block 510). The initial harmonic calculations are considered to have a phase offset of zero. Later harmonics are phase aligned to this initial harmonics calculation. Where an initial harmonics calculation has not yet been calculated (block 510), a harmonics calculation is performed on the burst demodulation data for the initial sector (block 515). This harmonics calculation may be done consistent with any harmonic calculation known in the art. For example, the harmonic may be sensed/calculated in accordance with the circuits and processes disclosed in U.S. patent application Ser. No. 12/851,455 entitled "Systems and Methods for Servo Data Based Harmonics Calculation" and filed by Mathew et al. on Aug. 5, 2010. Based upon the disclosure provided herein, one of ordinary skill in the art will recognize a variety of systems, circuits and methods known in the art that may be used for calculating harmonics in accordance with different embodiments of the present invention.

The aforementioned computation results in a real and an imaginary portion as set forth in the following equation:

$$X[1,l] = \sum_{n=0}^{N-1} x_1[n] \cdot c_l[n] - j \sum_{n=0}^{N-1} x_1[n] \cdot s_l[n],$$

where $X_1[n]$ for n=0, 1, ..., N−1, denote the periodic pattern averaged over the first sector, $$\sum_{n=0}^{N-1} x_1[n] \cdot c_l[n]$$

is the real portion, $$\sum_{n=0}^{N-1} x_1[n] \cdot s_1[n]$$

is the imaginary portion, and $c_l[n]$ and $s_l[n]$ are parameters chosen based upon the periodicity of the periodic pattern. These real and imaginary portions of the calculated harmonics are stored (block 520) and a flag indicating that the initial harmonics calculation is complete and stored is set (block 522). Again, the initial harmonic calculations are considered to have a phase offset of zero. Later harmonics are phase aligned to this initial harmonics calculation that is stored.

Alternatively, where an initial harmonics calculation has been previously calculated (block 510), a harmonics calculation is performed on the burst demodulation data for the subsequent sector from which the periodic data was derived (block 530). As with the initial harmonics calculation, the calculation may be done consistent with any harmonic calculation known in the art. For example, the harmonic may be sensed/calculated in accordance with the circuits and processes disclosed in U.S. patent application Ser. No. 12/851, 455 entitled "Systems and Methods for Servo Data Based Harmonics Calculation" and filed by Mathew et al. on Aug. 5, 2010. Based upon the disclosure provided herein, one of ordinary skill in the art will recognize a variety of systems, circuits and methods known in the art that may be used for calculating harmonics in accordance with different embodiments of the present invention.

The aforementioned computation results in a real and an imaginary portion as set forth in the following equation:

$$X[k, l] = \sum_{n=0}^{N-1} x_k[n] \cdot c_l[n] - j\sum_{n=0}^{N-1} x_k[n] \cdot s_l[n],$$

where $x_k[n]$ for $n=0, 1, \ldots, N-1$, denote the periodic pattern averaged over the k-th sector, $$\sum_{n=0}^{N-1} x_k[n] \cdot c_l[n]$$

is the real portion, $$\sum_{n=0}^{N-1} x_k[n] \cdot s_l[n]$$

is the imaginary portion, and $c_l[n]$ and $s_l[n]$ are parameters chosen based upon the periodicity of the periodic pattern.

Next, an estimate of the phase difference between the initial harmonics value and the recently calculated harmonics value (i.e., the harmonic of k-th read-event or sector) (block 535). As an example, assume the first and third harmonics are computed as follows:

$$X[k,l] = X_r[k,l] + jX_i[k,l], \text{ for } l = 1, 3,$$

and where $\{X_{r[k,l]}, X_i[k,l]\}$ are the real and imaginary parts of the l-th harmonic of the k-th read event. In this case, the estimated phase difference of the l-th harmonic of the k-th read event is calculated in accordance with the following equation:

$$\varphi[k, l] = \frac{\Theta[k, l]}{|\Theta[k, l]|} = \varphi_r[k, l] + j\varphi_i[k, l],$$

with $$\Theta[k, l] = \frac{X[k, l]}{X[1, l]}.$$

In this case, $$\varphi_r[k, l] = \frac{X_r[k, l] \cdot X_r[1, l] + X_i[k, l] \cdot X_i[1, l]}{\beta[k, l]},$$

$$\varphi_i[k, l] = \frac{X_i[k, l] \cdot X_r[1, l] - X_r[k, l] \cdot X_i[1, l]}{\beta[k, l]},$$

and $$\beta[k, l] = |X[1, l]| \cdot |X[k, l]|$$
$$= \sqrt{X_r^2[1, l] + X_i^2[1, l]} \sqrt{X_r^2[k, l] + X_i^2[k, l]}.$$

The aforementioned estimated phase difference is utilized to compute phase aligned harmonics for the currently processing sector (block 540). Such phase aligned harmonics may be calculated in accordance with the following equation:

$$\tilde{X}_k[k, l] = \varphi^*[k, l] \cdot X[k, l]$$
$$= (\varphi_r[k, l] \cdot X_r[k, l] + \varphi_i[k, l] \cdot X_i[k, l]) +$$
$$j(\varphi_r[k, l] \cdot X_i[k, l] - \varphi_i[k, l] \cdot X_r[k, l]).$$

The aforementioned phase aligned harmonic value is then incorporated in a running average value (block 545). Such averaging operates to reduce noise characteristics of the calculated harmonics. In one particular embodiment of the present invention, harmonic calculations for forty or more regions are averaged together in the running average. The aforementioned phase aligned harmonic is equation:

$$\tilde{X}_k[k, l] = \frac{\Theta^*[k, l]}{|\Theta[k, l]|} \cdot X[k, l] = \frac{X[1, l]}{|X[1, l]|} \cdot |X[k, l]|.$$

Therefore, accumulating the phase aligned harmonics over several read events (i.e., sectors), the resulting running average is consistent with the following equation:

$$\sum_k \tilde{X}_k[k, l] = \frac{X[1, l]}{|X[1, l]|} \cdot \sum_k |X[k, l]|$$
$$= \frac{X_r[1, l] + jX_i[1, l]}{\sqrt{X_r^2[1, l] + X_i^2[1, l]}} \cdot \sum_k \sqrt{X_r^2[k, l] + X_i^2[k, l]}.$$

The above mentioned output is then divided by the number of constituent elements (k) to yield an average harmonics output. Based upon the disclosure provided herein, one of ordinary skill in the art will recognize other numbers of harmonics that may be included in averaged output. The resulting averaged output may be provided to a fly height calculation circuit as are known in the art. Based upon the disclosure provided herein, one of ordinary skill in the art will recognize a variety of other uses for the averaged output.

Figure 6A:
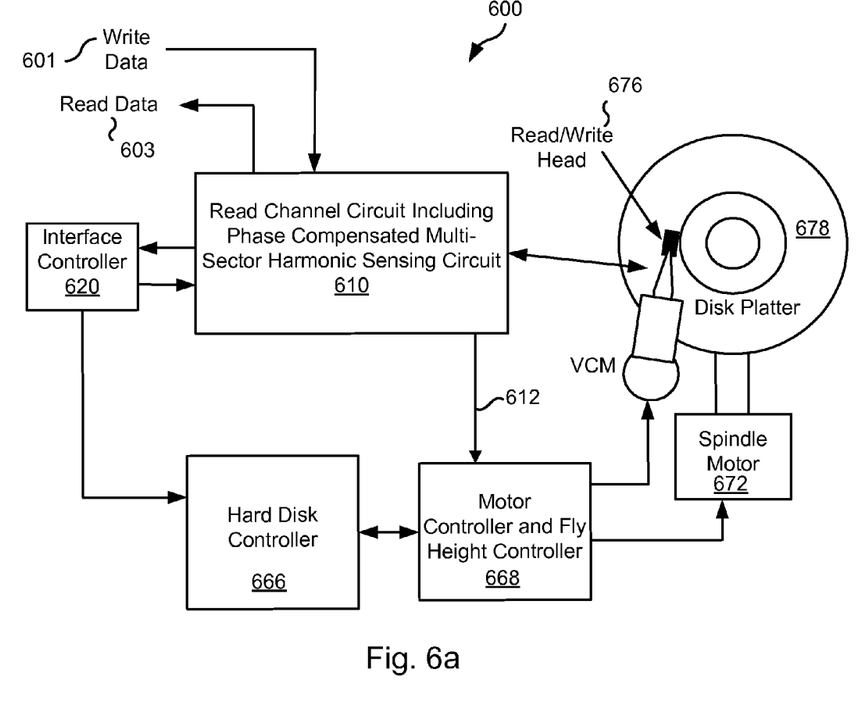
FIG. 6a depicts a storage device including a read channel including phase compensated harmonic calculation in accordance with one or more embodiments of the present invention.

Turning to FIG. 6a, a storage device 600 including a read channel circuit 610 including phase compensated multi-sector harmonic sensing circuit is shown in accordance with one or more embodiments of the present invention. Storage device 600 may be, for example, a hard disk drive. Read channel circuit 610 includes phase compensated multi-sector harmonic sensing that may be implemented consistent with that discussed in relation to FIG. 2 or FIG. 4 above, and/or may operate consistent with the methods discussed above in relation to FIG. 3 or FIG. 5 above. Further, read channel circuit 610 may include a data detector, such as, for example, a Viterbi algorithm data detector, and/or a data decoder circuit, such as, for example, a low density parity check decoder circuit. In addition to read channel circuit 610, storage device 600 includes a read/write head assembly 676 disposed in relation to a disk platter 678. Read/write head assembly 676 is operable to sense information stored on disk platter 678 and to provide a corresponding electrical signal to read channel circuit 610.

Storage device 600 also includes an interface controller 620, a hard disk controller 666, a motor controller and fly height controller 668, and a spindle motor 672. Interface controller 620 controls addressing and timing of data to/from disk platter 678. The data on disk platter 678 consists of groups of magnetic signals that may be detected by read/write head assembly 676 when the assembly is properly positioned over disk platter 678. In one embodiment, disk platter 678 includes magnetic signals recorded in accordance with a perpendicular recording scheme. In other embodiments of the present invention, disk platter 678 includes magnetic signals recorded in accordance with a longitudinal recording scheme. Motor controller and fly height controller 668 controls the spin rate of disk platter 678 and the location of read/write head assembly 676 in relation to disk platter 678.

Figure 6B:
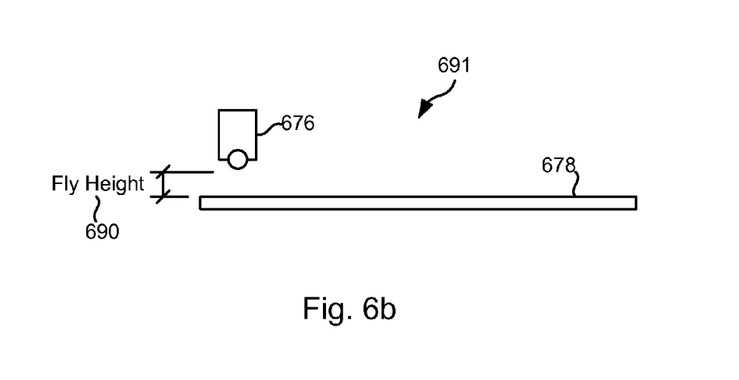

As shown in a cross sectional diagram 691 of FIG. 6b, the distance between read/write head assembly 676 and disk platter 678 is a fly height 690. Fly height 690 is controlled by motor controller and fly height controller 668 based upon a harmonics value 612 provided by read channel circuit 610. The accuracy of harmonics value 612 is improved by the phase offset based spectral aliasing compensation applied by read channel circuit 610.

In a typical read operation, read/write head assembly 676 is accurately positioned by motor controller and fly height controller 668 over a desired data track on disk platter 678. Motor controller and fly height controller 668 both positions read/write head assembly 676 in relation to disk platter 678 (laterally and vertically) and drives spindle motor 672 by moving read/write head assembly 676 to the proper data track on disk platter 678 under the direction of hard disk controller 666. Spindle motor 672 spins disk platter 678 at a determined spin rate (RPMs). Once read/write head assembly 678 is positioned adjacent the proper data track, magnetic signals representing data on disk platter 678 are sensed by read/write head assembly 676 as disk platter 678 is rotated by spindle motor 672. The sensed magnetic signals are provided as a continuous, minute analog signal representative of the magnetic data on disk platter 678. This minute analog signal is provided by read/write head assembly 676 to read channel circuit 610. In turn, read channel circuit 610 decodes and digitizes the received analog signal to recreate the information originally written to disk platter 678. This data is provided as read data 603 to a receiving circuit. A write operation is substantially the opposite of the preceding read operation with write data 601 being provided to read channel circuit 610. This data is then encoded and written to disk platter 678.

At times, a signal derived from disk platter 678 and/or internally generated by read channel circuit 610 may be processed to determine a harmonics value relevant to fly height. In some embodiments of the present invention, determining the harmonics value may be done consistent with the methods discussed above in relation to FIG. 3 or FIG. 5 above. In various cases, a circuit consistent with that discussed in relation to FIG. 2 or FIG. 4 above may be used. In various cases, fly height is re-evaluated when a change in operational status of storage device 600 is detected. Such an operational change may include, but is not limited to, a change in an operational voltage level, a change in an operational temperature, a change in altitude, or a change in bit error rate. Based upon the disclosure provided herein, one of ordinary skill in the art will recognize a variety of operational status that may be monitored in storage device 600, and how changes in such status may be utilized to trigger a re-evaluation of fly height.

In conclusion, the invention provides novel systems, devices, methods and arrangements for phase compensated harmonics measurement. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A harmonics calculation circuit, the circuit comprising:
   a harmonic calculation circuit operable to calculate a first harmonic based on a periodic data pattern and a second harmonic based on the periodic data pattern;
   a phase difference estimation circuit operable to calculate a phase difference between the first harmonic and the second harmonic; and
   a phase offset compensation circuit operable to align the second harmonic with the first harmonic to yield an aligned harmonic.

2. The circuit of claim 1, the circuit further comprising:
   an averaging circuit, wherein the averaging circuit is operable to calculate a harmonics average including at least the first harmonic and the aligned harmonic.

3. The circuit of claim 1, wherein the circuit further comprises:
   a read/write head assembly disposed in relation to a storage medium; and
   wherein the periodic data pattern is derived by the read/write head assembly from a user data region of the storage medium.

4. The circuit of claim 1, wherein the circuit further comprises:
   a read/write head assembly disposed in relation to a storage medium; and
   wherein the periodic data pattern is derived by the read/write head assembly from a servo data region of the storage medium.

5. The circuit of claim 4, wherein the periodic data pattern is a burst demodulation pattern.

6. The circuit of claim 1, wherein the first harmonic includes a first imaginary portion and a first real portion, and wherein the second harmonic includes a second imaginary portion and a second real portion.

7. The circuit of claim 6, wherein the phase difference estimation circuit is operable to calculate a real portion of the phase difference and an imaginary portion of the phase difference using the first real portion, first imaginary portion, second real portion and a second imaginary portion.

8. The circuit of claim 7, wherein the phase offset compensation circuit is operable to align the second harmonic with the first harmonic based at least in part on a first phase difference and a second phase difference.

9. A method for harmonics calculation, the method comprising:
   providing a harmonics calculation circuit;
   receiving a first data set representing a periodic data from a first region of a storage medium;
   calculating a first harmonic based on the first data set;
   receiving a second data set representing the periodic data from a second region of the storage medium;
   calculating a second harmonic based on the second data set; and
   phase aligning the second harmonic and the first harmonic to yield a phase aligned harmonic.

10. The method of claim 9, wherein phase aligning the second harmonic and the first harmonic includes:
    calculating a phase difference between the second harmonic and the first harmonic.

11. The method of claim 10, wherein the method further comprises:
    calculating an average harmonics value including at least the phase aligned harmonic.

12. The method of claim 10, wherein the first harmonic includes a first imaginary portion and a first real portion, and wherein the second harmonic includes a second imaginary portion and a second real portion.

13. The method of claim 12, wherein the phase difference includes an imaginary portion and a real portion computed based on the first imaginary portion, the second imaginary portion, the first real portion and the second real portion.

14. The method of claim 13, wherein phase aligning the second harmonic and the first harmonic to yield a phase aligned harmonic is based at least in part on the real and imaginary portions of the phase difference.

15. The method of claim 9, wherein the harmonics calculation circuit includes:
    a read/write head assembly disposed in relation to a storage medium; and
    wherein the first data set is derived by the read/write head assembly from the first region of the storage medium, and wherein the second data set is derived by the read/write head assembly from the second region of the storage medium.

16. The method of claim 15, wherein the first region is a first user data region, and wherein the second region is a second user data region.

17. The method of claim 15, wherein the first region is a first servo data region, and wherein the second region is a second servo data region.

18. A storage device, the storage device comprising:
    a storage medium having a first region and a second region;
    a harmonic calculation circuit operable to receive a first data set corresponding to a periodic data pattern derived from the first region and a second data set corresponding to the periodic data pattern derived from the second region, and wherein the harmonic calculation circuit is operable to calculate a first harmonic based on a periodic data pattern and a second harmonic based on the periodic data pattern;
    a phase difference estimation circuit operable to calculate a phase difference between the first harmonic and the second harmonic; and
    a phase offset compensation circuit operable to align the second harmonic with the first harmonic to yield an aligned harmonic.

19. The storage device of claim 18, the storage device further comprising:
    an averaging circuit, wherein the averaging circuit is operable to calculate a harmonics average including at least the first harmonic and the aligned harmonic.

20. The storage device of claim 18, wherein the first harmonic includes a first imaginary portion and a first real portion; wherein the second harmonic includes a second imaginary portion and a second real portion; wherein the phase difference estimation circuit is operable to calculate a real portion of the phase difference and an imaginary portion of the phase difference using the first real portion, first imaginary portion, second real portion and a second imaginary portion; and wherein the phase offset compensation circuit is operable to align the second harmonic with the first harmonic based at least in part on the real and imaginary portions of the phase difference.

* * * * *